SIGNALLING SWITCH GEAR
Original Filed Nov. 19, 1959
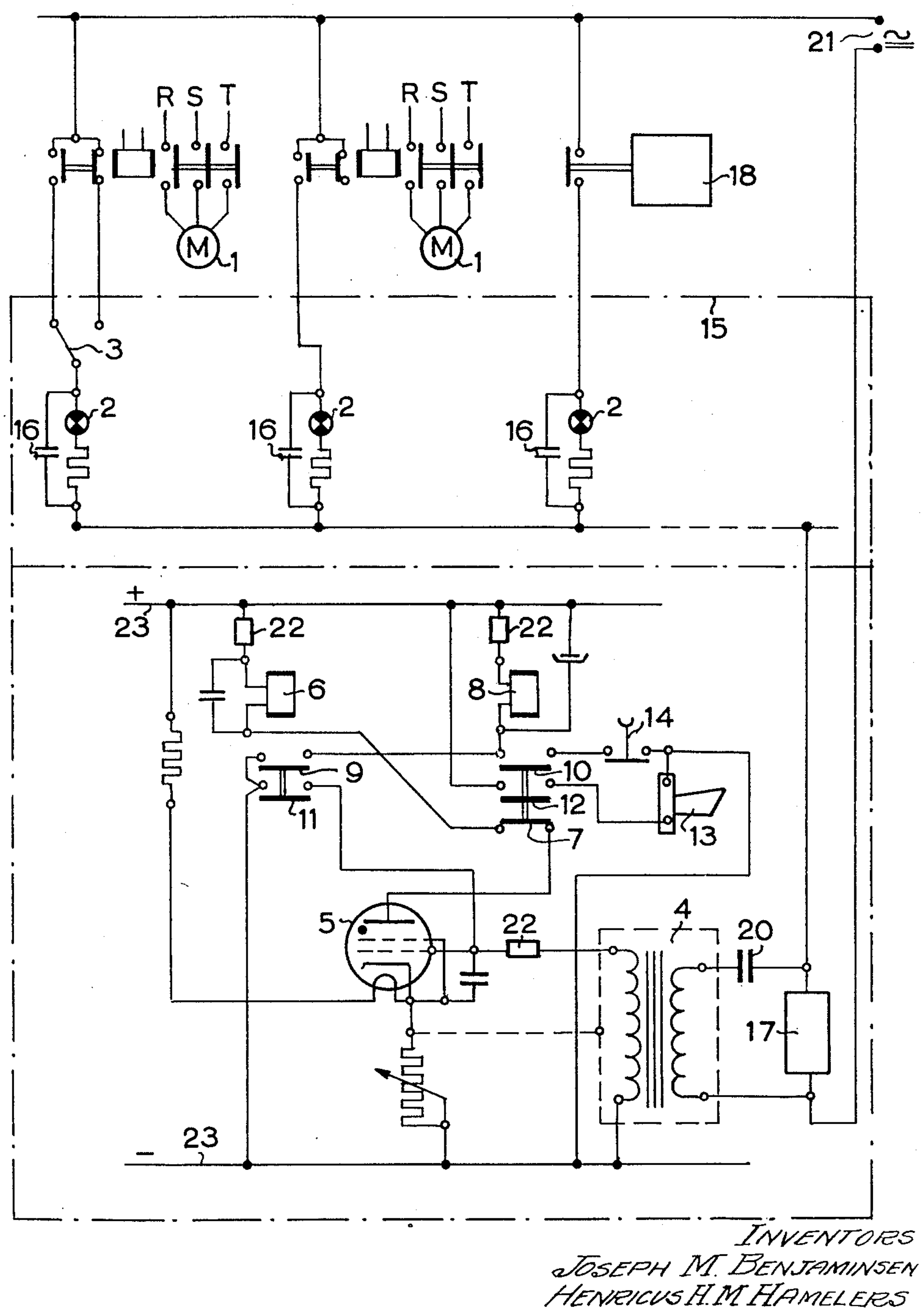
INVENTORS
JOSEPH M. BENJAMINSEN
HENRICUS H.M. HAMELERS
BY
Cushman, Darby & Cushman
ATTORNEYS United States Patent Office 3,228,018

Patented Jan. 4, 1966

3,228,018

SIGNALLING SWITCH GEAR

Joseph M. Benjaminsen and Henricus H. M. Hamelers, Beek, Netherlands, assignors to Stamicarbon N.V., Heerlen, Netherlands Continuation of application Ser. No. 854,174, Nov. 19, 1959. This application Sept. 18, 1962, Ser. No. 224,392
Claims priority, application Netherlands, Nov. 22, 1958, 233,505
4 Claims. (Cl. 340—256)

This invention relates to a signalling circuit and more particularly to an improved circuit wherein a change in current within an electrical system is effectively recognized and indicated.

The present application is a continuation of the pending United States application Serial No. 854,174 filed on Nov. 19, 1959, now abandoned.

In an electrical system, which for example may comprise a plurality of electric motors, measuring devices, etc., it has been the usual practice to provide indicating devices for each piece of equipment in the form of a visual indicator by which changes in the state of operation of the equipment are shown. In addition to these visual signals there is often provided an audio indicator to supplement the visual devices. Systems utilizing this combined signalling arrangement in the past have inherently made the operation of the audio indicator dependent on proper operation of the visual devices when the audio and visual members were electrically interconnected. To avoid the reliability problems which have arisen due to faulty operation of the visual indicators in prior art arrangements, other systems have employed audio and visual indicators entirely independent of one another with the resultant disadvantage of increased equipment costs.

These shortcomings have been overcome in the present invention by an improved signalling circuit which functions on changes in current in the electrical system to actuate the audio indicator.

An object of the invention is to provide an electrically interconnected signalling circuit having indicators for each piece of equipment in the system as well as supplemental indicating means operatively independent of the individual indicators.

A further object is to provide an improved signalling circuit without the necessity of employing costly independent circuit components.

The foregoing objects are accomplished by electrically by-passing the individual indicator means associated with each piece of equipment by transient responsive components which couple the sudden changes in current of the equipment to circuitry which is responsive only to transients to energize the supplemental indicator.

Other objects and advantages will be apparent from the following description of an illustrative embodiment of the invention, pointed out particularly in the appended claims, when the foregoing are taken in conjunction with the accompanying drawing in which one embodiment of the invention is shown.

Referring to the drawing, an exemplary electrical system is shown. This system includes several lines which, in the illustrative embodiment, comprise a pair of motors 1, and a measuring instrument 18. The signalling circuit, illustrated as being associated with a signalling panel 15, is connected to a voltage source through relay controlled switches operated by the equipment, the motors 1 and measuring instrument 18. Non-capacitive impedances are joined in series with each of the several lines. These include individual primary indicators, such as lamps 2, associated with each piece of equipment. In parallel with each of the lamps is a condenser 16. With all of the equipment controlled switches closed, all of the lamp circuits are in parallel with one another and in series with an impedance 17 across the supply.

A change-over switch 3 is shown associated with one of the motors 1. This switch is employed when the motor is switched off intentionally. However, this switch is not an essential part of the invention and is included only to illustrate an incidental feature of the arrangement.

In parallel with impedance 17 between two points in the system is a shunt line comprising a series combination of a condenser 20 and the primary winding of a peaking transformer 4. The secondary winding is connected to an output device which includes an amplifying device, in this case a thyratron tube 5, such that any signal on this winding is supplied to tube 5 as an input. A positive direct current voltage supply is normally connected to the plate of tube 5 through a relay winding 6 and the normally closed contacts 7 operatively associated with a relay winding 8. The relay contacts controlled by winding 6 are normally open contacts 9 and 11. When closed, contacts 9 complete a circuit through winding 8 from the positive side of the direct voltage source to the negative side. Contacts 11 operate concurrently with contacts 9 to connect this negative reference to the input grid of tube 5. Relay winding 8 has associated with it not only normally closed contacts 7, but also normally open contacts 10 and 12. These contacts operate concurrently such that when the relay operates, contacts 7 open and contacts 10 and 12 close. Closure of contacts 12 completes a circuit through an indicator, in this case an audio device 13, between the positive and negative voltage references. Simultaneously, contacts 10 close to connect a circuit comprising winding 8 and a mechanical switch 14 in parallel with the audio device 13.

Although an alternating source is shown, either an alternating or a direct voltage source may be utilized to energize the lamps 2 and the impedance 17. If a direct-current source is employed, impedance 17 comprises a resistor which offers a very low impedance to steady-state current through resistor 17, as opposed to that of the condenser 20 and primary winding combination in parallel therewith, whereas rapidly changing current intensities encounter very low relative impedance through the series arrangement of the condenser 20 and the transformer primary as compared with resistor 17.

The same type of relative impedance relationship is desired between the impedance 17 and the condenser-primary winding circuit in parallel therewith when an alternating source is employed. This may be achieved by utilizing a filter circuit as impedance 17, this filter offering high impedance to transients and low impedance to steady-state conditions.

Transformer 4 is a peaking transformer, i.e., a known type of transformer which, by the special construction of its magnetic circuit, is suited to transform steep peaks, and responds poorly to "slowly" changing or steady state currents. By employing such a transformer, primary currents of varying strengths but with steep slopes can produce appreciable secondary signals.

Since the peaking transformer does produce an appreciable output in spite of the fact that a low amplitude signal is applied to the primary winding thereof, it is necessary to connect the secondary winding to a device which operates only above a certain threshold value in order to insure that the supplemental indicating device 13 will not be energized due to stray disturbances sensed by the peaking transformer. Accordingly, in this embodiment a thyratron is employed. However, other devices such as a cold cathode tube, a transducer, etc. may also be utilized.

Although the primary indicators 2 are set forth as lamps and the supplemental indicator 13 is an audio device, it will be understood that such an arrangement is for purpose of illustration only and other indicating devices may easily be substituted therefore within the scope of the invention.

With the structural features of the signalling system set forth, a typical cycle of operation will now be described. A change in the elements of the electrical system, motors 1 and measuring equipment 18, results in the closing of associated contacts in the signalling circuit to connect the appropriate indicating devices 2 to the supply voltage. The initial current surge in the signalling circuit is a transient which is shunted around lamp 2 by the condenser 16 and which by-passes impedance 17 which offers a relatively high impedance to transients. In bypassing impedance 17, the primary winding of peaking transformer 4 is energized to produce an appreciable output at its secondary. This signal is applied to the thyratron to cause conduction thereof. The change in current in the plate circuit of tube 5 energizes relay winding 6, closing contacts 9 and 11. With a negative voltage now applied to the thyratron grid through contacts 11, the tube will be cut off. The closing of contacts 9 results in completing a circuit through winding 8 between the positive and negative references. The initial surge of current in this circuit energizes relay winding 8 to open contacts 7 while simultaneously closing contacts 10 and 12. The opening of contacts 7 cuts off relay winding 6 from the plate circuit of tube 5 thereby de-energizing the relay and allowing contacts 9 and 11 to open. Relay winding 8 accordingly is connected to the negative reference through contacts 10 and 14. Since contacts 12 are closed, indicator 13 is energized. When it is desired to terminate the operation of device 13, switch 14 is opened to de-energize relay winding 8. This opens contacts 10 and 12 and closes contacts 7. Indicator 13 is thereby de-energized and the circuit is in its initial condition ready to respond to the next signalling transient sensed by the peaking transformer 4.

It should be particularly noted that the operation just described is dependent only on the transient current caused by the change in condition of the elements of the electrical system being monitored. The energization of indicator 13 does not require the operation of an indicator 2 even though these two types of indicators are present in the same signalling circuit. Thus, the signalling circuit is operative even though the primary indicators 2 may be defective.

During the steady-state condition when the signalling circuit is energized, the peaking transformer is inoperative since at this time its primary winding is effectively bypassed by the impedance 17. Accordingly, indicator 13 is operative only if switch 14 has not been opened. After the initial transient, the steady-state current effectively by-passes condenser 16 through indicator 2. Thus, the appropriate indicator 2 becomes the principal signalling means to indicate that an element of the electrical system has changed its condition.

The particular circuitry arrangement shown is only an example of the signalling circuit in which the inventive features of this disclosure may be utilized. It will be readily apparent to one skilled in the art that certain modifications may be made to the arrangement within the spirit of the invention as defined by the appended claims.

What is claimed is:

1. A signalling circuit to detect sudden transient electrical currents within an electrical system having a plurality of lines therein, said transient currents being created by abrupt changes of steady-state currents in said lines, comprising: a transformer having a primary and secondary winding, a shunt line including said primary winding coupled across two points of said system, an impedance connected between said two points and joined in series with said plurality of lines, said impedance being characterized by having a low value with respect to said shunt line during steady-state operation and a high value with respect to the shunt line during transient periods within said system; at least one output device coupled to said secondary winding; non-capacitive impedances in series with each of said plurality of lines, and capacitive means in parallel with said non-capacitive impedances for providing a path for transient currents around said non-capacitive impedances and through said primary winding to thereby energize said secondary winding and said output device.

2. A signalling circuit as set forth in claim 1, said non-capactive impedances including primary indicating means and said output device comprising supplemental indicating means.

3. A signalling circuit as set forth in claim 2 wherein said transformer is a peaking transformer.

4. A signalling circuit as set forth in claim 2 wherein said transformer is a peaking transformer and said shunt line includes a condenser in series with said primary winding.

References Cited by the Examiner

UNITED STATES PATENTS

| | | | |
|---|---|---|---|
| 2,329,090 | 9/1943 | Smith et al. | 328—74 X |
| 2,724,107 | 11/1955 | Born | 340—248 |
| 2,800,645 | 7/1957 | Koch | 340—213 |
| 2,832,068 | 4/1958 | Warren | 340—213 |
| 2,994,073 | 7/1961 | Pelovitz | 340—248 X |

NEIL C. READ, *Primary Examiner.*